March 1, 1927.
J. E. WRIGHT
1,619,230
CALCULATOR
Filed Oct. 31, 1925
3 Sheets-Sheet 1
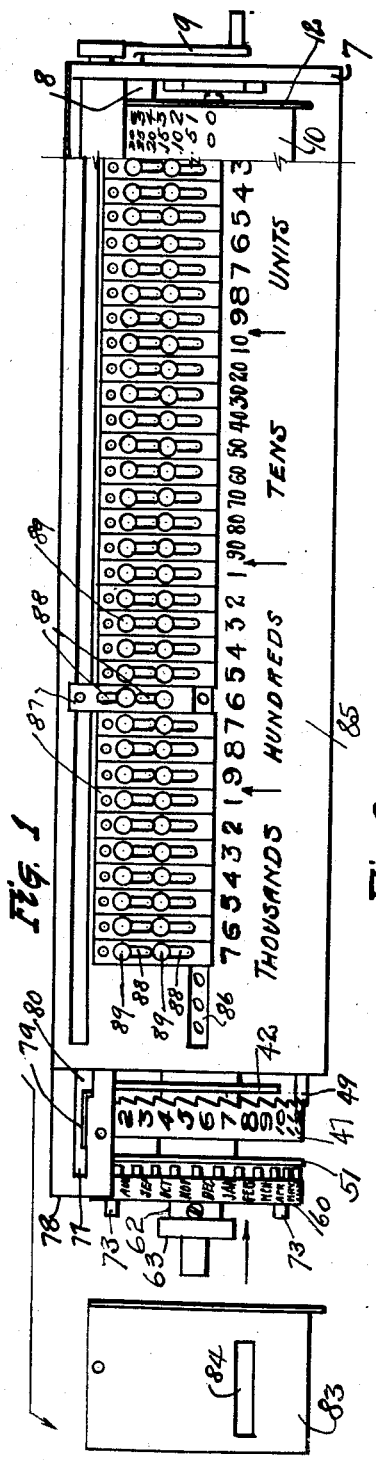
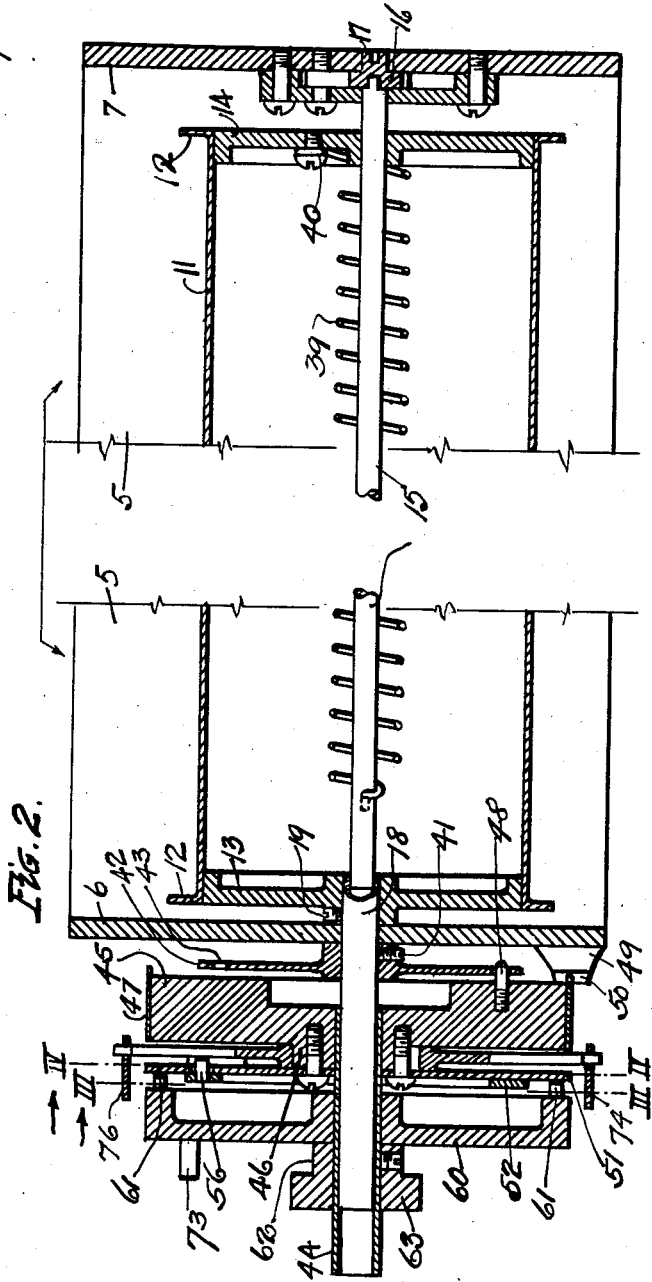
INVENTOR
John E. Wright March 1, 1927.

J. E. WRIGHT

CALCULATOR

Filed Oct. 31, 1925

INVENTOR
John E. Wright

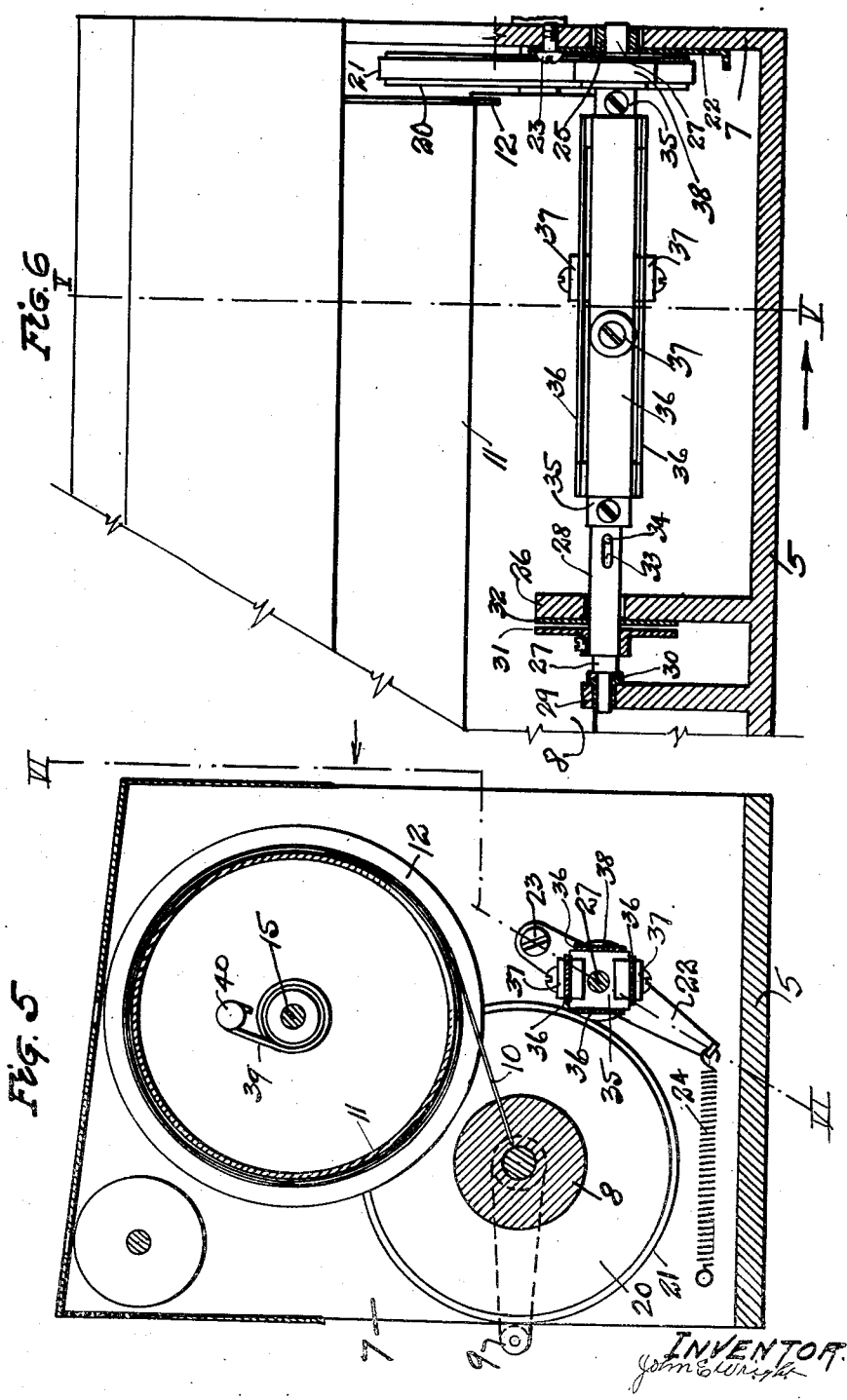

Patented Mar. 1, 1927.

1,619,230

UNITED STATES PATENT OFFICE.

JOHN E. WRIGHT, OF MAYFIELD, KENTUCKY.

CALCULATOR.

Application filed October 31, 1925. Serial No. 66,021.

This invention relates to mechanical calculating devices in general, but has particular reference to such devices in which co-operating rotatable discs, bearing suitable integrating characters, co-act with a rotatable cylinder adapted for winding thereupon a flexible band or web which also bears integrations upon its outer surface, in such a way that readings of the results of various calculations may be taken from the integrations on said web. In a co-pending application, filed coincidentally herewith, Serial No. 66020, I have described and claimed a form of web which I prefer to use with my improved calculators, but which is also adapted for use with other calculating devices, and the specific web used therefore forms, per se, no part of the present invention.

The principal object of this invention is to improve upon the devices of this general character known heretofore, by providing a calculator in which—

(a) Each of the discs may be turned forward without causing movement of another disc, or of the cylinder;

(b) One at least of the discs may be turned backward without affecting the position of any other disc, or of the cylinder;

(c) Rotation of one disc to a predetermined position may cause rotation of another disc through a less but predetermined angle, even though the first disc turn less than a complete revolution;

(d) After having been turned forward, the cylinder may return automatically to the starting position upon manual release of a member forming part of the turning mechanism, and without affecting the position of any one of the discs;

(e) The integrations borne by the cylinder shall be placed upon a band or web of flexible material of greater length than the circumference of the cylinder, and provision shall be made for winding such web upon the cylinder and unwinding it therefrom;

(f) Provision shall be made for exposing selectively different portions of the web for the purpose of taking readings from the integrations thereon; and (g) The whole device shall be simple, comparatively inexpensive, unlikely to get out of order, and positive and dependable in operation.

The means by which I accomplish the foregoing and other objects, and the manner of their accomplishment, readily will be understood from the following description on reference to the accompanying drawings, in which—

Fig. 1 is a top plan view of my improved calculator, with the cover over the cylinder partly broken away at its right-hand end, some of the slides omitted at its left-hand end, and the cover for the discs removed and shown near the left-hand end of the calculator.

Fig. 2 is a horizontal section, on a larger scale, substantially on the center line of the cylinder.

Fig. 5 is a sectional elevation substantially on line V—V of Fig. 6.

Fig. 6 is a sectional elevation of a portion of the right-hand end of the calculator, showing the speed-governor and other driving mechanism for the cylinder.

Figure 3:
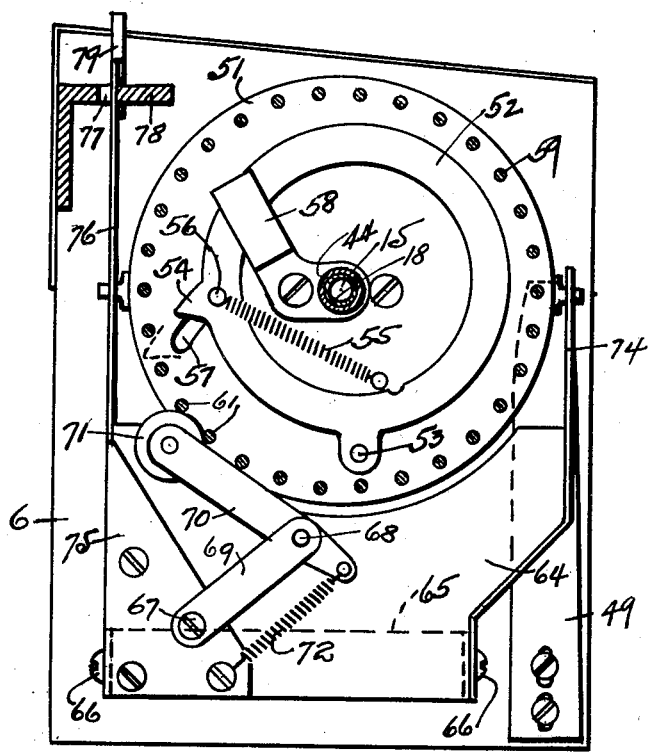
Fig. 3 is a sectional elevation, substantially on the line III—III of Fig. 2.
Figure 4:
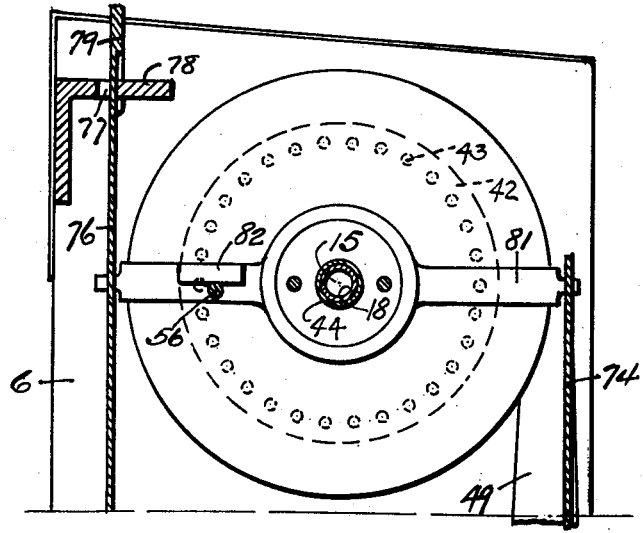
Fig. 4 is a sectional elevation substantially on the line IV—IV of Fig. 2.

The frame of the calculator may be designed and constructed in any preferred manner, but for purposes of illustration is shown in the drawings as comprising a base 5 and two end pieces 6 and 7, extending vertically upward from said base at its respective ends. A roller 8 is rotatably mounted between said end pieces, the reduced portion of said roller that is journalled in end piece 7 extending therethrough, and having secured at its outer end a hand crank 9, by which said roller may be turned. A flexible band or web 10, having suitable integrating characters inscribed upon the outer face thereof, as indicated in Fig. 1, has one of its ends secured to roller 8, and leads therefrom forward and upward to and around a hollow cylinder 11, which is rotatably supported between the end pieces 6 and 7, parallel with roller 8, and to which the other end of said web is secured in any preferred manner (not shown). The length of the cylinder is substantially the same as the width of the web, and at each of its ends the shell of the cylinder is provided with a flange 12 to assist in guiding the web as it is wound upon the cylinder, said shell being secured upon end plates or hubs 13 and 14, respectively.

A shaft 15 has one of its ends secured at the center of a circular disc 16, having a reduced hub 17 which is held in an opening in end piece 7, the other end of said shaft having loosely mounted thereon a sleeve 18 which is journalled in end piece 6. End plate 14 of the cylinder 11 is loosely mounted upon the shaft 15, and end plate 13 is secured upon sleeve 18, as by a set screw 19.

Secured upon the reduced portion of roller 8, adjacent the end piece 7, is a circular disc 20, having a peripheral facing 21 of material adapted to provide a frictional driving surface. A bearing support 22 has one of its ends pivotally secured to the inner face of end piece 7 near disc 20, as by a cap screw 23, and at the other end of said support is secured one end of a tension spring 24, the other end of which is secured to end piece 7. Near the middle of support 22 is secured a bearing 25, which extends through and is freely movable in an opening in end piece 7. Between said bearing and a support 26 carried by the base 5, is mounted a speed governor of the centrifugal type, comprising a shaft 27, one end of which is journalled in bearing 25, while its other end is slidably engaged by a sleeve 28 journalled in support 26, and said shaft extends through said sleeve and is journalled in a support 29 carried by the base 5 near support 26, a thrust bearing 30 preferably being provided between a shoulder near the end of shaft 27 and support 29, a friction disc 31 being secured upon sleeve 28 in position to co-operate with a friction disc 32 secured to support 26, and rotation of shaft 27 and sleeve 28 relative to each other being prevented, while limited sliding movement of said sleeve on said shaft is permitted, by loose engagement of a slot 33 in said sleeve with a pin 34 projecting from said shaft. Two similar collars 35, having substantially square peripheries, are secured upon shaft 27 and sleeve 28 respectively, and four strips 36 of resilient material are secured between said collars, each of said strips having a weight 37 attached thereto near the middle thereof. On shaft 27, adjacent the bearing support 22, is secured a disc 38, which preferably has a peripheral facing similar to that of disc 20, and which is held by spring 24 in frictional engagement with the latter disc.

A torsion spring 39 has one of its ends secured to shaft 15, and its other end secured at 40 to the inner face of end piece 14 of cylinder 11. Upon sleeve 18, adjacent the outer face of end piece 6, is secured, as by a set screw 41, a circular disc 42, having a series of holes 43 arranged symmetrically near the periphery thereof. A sleeve 44 is loosely mounted upon sleeve 18, and upon sleeve 44 is secured a circular disc 45, having a hub 46, and a rim 47 which projects somewhat beyond the plane of the inner face of said disc, said rim bearing integration characters, and its projecting edge having ratchet teeth, as shown in Fig. 1. A pin 48 projects from the inner face of disc 45, in position to engage the holes 43 in disc 42, and a strip 49 of resilient material has its lower end secured to the outer face of end piece 6, in such a position that a detent 50 at the upper, free end of said strip engages the ratchet teeth of rim 47 of disc 45, when said disc is close enough to holes 43, for pin 48 to be entered in one of the holes 43.

A circular disc 51 is secured to the face of hub 46 of disc 45, and upon the outer face of disc 51 is eccentrically mounted an annular disc 52, which is pivotally secured at 53, has a projection 54 on its periphery, and is retained yieldingly to its initial position by a tension spring 55, one end of which is secured to the outer face of disc 51, while its other end is secured to a pin 56 carried by annular disc 52, extending into a movement-limiting slot 57 in disc 53, and projecting somewhat beyond the inner face of said disc. A guide clip 58 is secured upon the outer face of disc 51, in position to assist in retaining annular disc 52 in place.

A circular disc 60 is loosely mounted on sleeve 44, being spaced slightly away from disc 51, so that the pins 61 a series of which project in symmetrical arrangement from disc 60, clear the face of the disc 51. The peripheral surface of disc 60 bears integration characters, as shown in Fig. 1. A collar 62 is secured adjustably upon sleeve 44 adjacent the outer face of disc 61, said collar preferably having an enlarged portion 63 to facilitate manual grasp thereof, and said collar acts as a stop to limit movement of disc 60 toward the outer end of sleeve 44. A plate 64 has its lower edge pivotally secured, as by a clip 65 and screws 66, to end piece 6, slightly above the level of the base 5, and upon the outer face of said plate is secured, as by a screw 67 and a pin 68, an arm 69, there being pivotally mounted on said pin, between said plate and said arm, an arm 70, carrying at its upper end a roller 71, and having secured at its lower end one end of a tension spring 72, the other end of which is secured to plate 64. The location of arm 70 is such that roller 71 is held by spring 72 yieldingly in engagement with the pins 61 of disc 60, and also in position to be engaged by the edge portion of the inner face of said disc, and thus to oppose movement thereof if said disc should tend to move away from the collar 62 upon movement of disc 51 away from disc 60. A pin 73, projecting from the outer face of disc 60, facilitates manual turning thereof.

At the front or right-hand side (Fig. 3) of plate 64 is secured a strap 74, which projects above said plate, and at the left-hand side of said plate is secured, as by a clip 75, a strap 76, which extends above said plate, through an opening 77 in a member 78 secured to the upper, rear or left-hand corner of end piece 6, and terminates in handle portion 79 adapted for manual grasp. The forward edge of the opening 77 is cut away at 80 to provide a holding notch for retaining the handle 79 in its most advanced position relative to end piece 6. Between straps 74 and 76 is secured a yoke 81, which is interposed between discs 45 and 51, said yoke having at its middle an opening which loosely embraces the hub 46 of disc 45, and having near said opening a lug 82, which projects from said yoke toward disc 51, in position to intercept pin 56 secured to annular disc 52. The location and dimensions of lug 82 are such that upon engagement of pin 56 therewith, and continued forward rotation of disc 51, and hence of annular disc 52, said annular disc will be moved to the position shown in dotted lines in Fig. 3, bringing the projection 54 into engagement with one of the pins 61 of disc 60 and thereby moving said disc rotatably in advance, the pin 56 meanwhile moving outward along the lower surface of the lug 82, until, when disc 60 has been moved an angular distance substantially equal to the spacing of the pins 61, the pin 56 will clear the lug, and the annular disc will return to its initial position, under action of spring 55. Meanwhile, the roller 71 will rectify the distance of advance rotation of disc 60, upon moving into the next space between two of the pins 61, and will retain disc 60 yieldingly in its new position.

A cover 83 is provided for the mechanism which includes the integrated discs 45 and 60, said cover being adapted to be secured removably to the member 78 which projects from the outer face of end piece 6 near its upper, rear corner, and said cover having a sight opening 84 through which a defined portion only of the integrated surface of each of said discs is visible when said cover is in place. As indicated in Fig. 1, the upper surface of the web 10 bears integrations which are arranged in series extending both longitudinally and transversely of said web, and over cylinder 11 is placed a cover 85, having a sight opening 86 extending longitudinally of said cover, and a series of slides 87, each having slots 88 therein which loosely engage pins 89 projecting from the upper surface of said cover. The width of the sight opening 86 is approximately equal to the space occupied by each of the transverse series of integrations on web 10, and the spacing of the slides 87 corresponds with that of the longitudinal columns of integrations on said web.

From the foregoing description of the principal parts that preferably are embodied in my improved calculator, it will be apparent that they are adapted to function, and the device is adapted to operate, as follows:—

For purposes of illustration, I have indicated in Fig. 1 of the drawings typical integrations of the cylinder 11 and discs 45 and 60, such as might be employed in calculating interest, discounts, or the like. When the cylinder is in its initial position, with the web fully wound thereupon (see Fig. 5), the transverse line of zeros on the web is in register with the sight opening 86 in the cylinder cover 85. Assuming that the device is to be used for calculating interest, and that the handle 79 is in the position indicated in Fig. 1, in which position it is held by its engagement with the notch 80, and the ratchet teeth of disc 45 are in position for engagement by the detent 50,—disc 45 is turned manually toward the front of the calculator, by means of collar 62, until the day of the month from which the interest is to date is in register with the sight opening 84 in cover 83, after which disc 60 is turned manually, in either direction, but preferably in a direction the reverse of that in which disc 45 is turned, until the desired month is similarly in register with said opening. The hand crank 9 is now turned manually to rotate roller 8 to the left (Fig. 5), and thereby to wind the web upon said roller, while unwinding it from cylinder 11, thus causing said cylinder to rotate to the right, against the action of spring 39, and causing disc 45 to turn in the same direction as the cylinder. When said disc is turned past the point at which the integration for the 30th, day of the month (assuming that there are 30 divisions marked upon said disc) appears below the sight opening 84, pin 56 engages lug 82, and moves annular disc 52 to advance disc 60 sufficiently to bring the next succeeding month under said sight opening. This operation is continued until the date appearing under the sight opening 84 is that to which it is desired to calculate the interest, whereupon turning of the hand crank is stopped, the parts then remaining stationary, due to engagement of the detent 50 with one of the ratchet teeth of the disc 45. The reading or readings for the amount of interest can now be taken directly from the figures on the web, by raising the one or ones of the slides 87 that correspond with the digits in the number representing the principal upon which the interest is to be computed. If, for example, the principal were $3,725, the reading exposed by moving the slide indicated by the numeral "3" in the "thousands" section, would be added to the readings similarly found for "7" in the "hundreds" section, "20" in the "tens" section, and "5" in the "units" section.

If it were now desired to compute the interest on a different amount of principal, starting at the date to which the first computation was carried, the handle 79 would be manually detached from notch 80 and moved to the left (Fig. 1), thereby releasing the ratchet teeth of disc 45 from detent 50, whereupon spring 39 would react to cause reverse rotation of cylinder 11 and roller 8, and the web would be wound upon said cylinder, and unwound from said roller, until it was returned to its initial position, with the transverse row of zeros thereon in register with the sight opening 86. Meanwhile, the discs 45 and 60 would remain stationary, and computation of the interest on the second amount of principal would be initiated without resetting said discs, and would be carried out in the same manner as before.

During reverse rotation of the cylinder under action of spring 39, the speed of rotation is regulated automatically by the centrifugal governor, the principle of operation of which is so well known that a detailed description thereof is not thought necessary herein.

Various modifications of minor details of my improved calculator will doubtless suggest themselves to those skilled in the art to which it appertains, and I therefore do not desire to limit my invention to the exact forms of construction or arrangements of parts shown and described.

Having now fully disclosed the invention, what is claimed is:—

1. In a calculator, having a rotatable cylinder, a roller, a flexible web between said cylinder and said roller, said web bearing integrations, and means for rotating said roller and said cylinder, the combination of a disc rotatable by rotation of said cylinder and movable out of engagement therewith, said disc also bearing integrations, and means for returning said cylinder to initial position after advance rotation thereof and of said disc, while said disc remains in its advanced position.

2. In a calculator, having a rotatable cylinder, a roller, a flexible web between said cylinder and said roller, said web bearing integrations, and means for rotating said roller and said cylinder, the combination of a disc rotatable by rotation of said cylinder, said disc bearing integrations, a second disc rotatable a predetermined angular distance by rotation of said first disc, said second disc also bearing integrations, and means for returning said cylinder to initial position after advance rotation thereof and of said first disc, while said disc remains in its advanced position.

3. In a calculator, having a rotatable cylinder, a roller, a flexible web between said cylinder and said roller, said web bearing integrations, and means for rotating said roller and said cylinder, the combination of a disc rotatable by rotation of said cylinder, said disc bearing integrations, a second disc rotatable a predetermined angular distance by rotation of said first disc, said second disc also bearing integrations, and means for returning said cylinder to initial position after advance rotation thereof and of both of said discs, while said discs remain in their advanced positions.

4. In a calculator, having a rotatable cylinder, a web adapted to be wound upon said cylinder and unwound therefrom, said web bearing integrations, and means for unwinding said web from said cylinder and thereby rotating it, the combination of a disc rotatable by rotation of said cylinder, said disc also bearing integrations, means for returning said cylinder to initial position while said disc remains in its advanced position, and means for releasing said disc for movement independently of movement of said cylinder.

5. In a calculator, having a rotatable cylinder, a web wound upon said cylinder and adapted to be unwound therefrom, said web bearing integrations, and means for unwinding said web from said cylinder and thereby causing it to rotate, the combination of a disc rotatable by rotation of said cylinder, said disc bearing integrations, a second disc rotatable by rotation of said first disc, said second disc also bearing integrations, means for rotating said cylinder to wind said web thereupon, and means for rotating said web in the opposite direction and thereby rotating said first disc, while said second disc remains unmoved.

6. A calculator having a rotatable cylinder, a roller, a web between said cylinder and said roller, said web bearing integrations, the combination of means for rotating said roller to wind said web thereupon while unwinding it from said cylinder, means for rotating said cylinder to wind said web thereupon while unwinding it from said roller, a disc rotatable by rotation of said cylinder, said disc bearing integrations, a second disc rotatable intermittently by continuous rotation of said first disc, said second disc also bearing integrations, and means for rotating said discs independently of rotation of said cylinder.

JOHN E. WRIGHT.